(12) United States Patent
Chávez Sandoval et al.

(10) Patent No.: US 11,732,816 B1
(45) Date of Patent: Aug. 22, 2023

(54) VALVE ASSEMBLY INCLUDING LOW FORCE UMBRELLA VALVE INSERTION

(71) Applicant: DELPHI TECHNOLOGIES IP LIMITED, St. Michael (BB)

(72) Inventors: César Caín Chávez Sandoval, Cd. Juarez (MX); Raul Buendia Blancas, Cd. Juarez (MX)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 17/737,289

(22) Filed: May 5, 2022

(51) Int. Cl.
| F16K 27/02 | (2006.01) |
| B60K 15/04 | (2006.01) |
| F16K 15/14 | (2006.01) |
| B60K 15/03 | (2006.01) |
| B65D 77/22 | (2006.01) |

(52) U.S. Cl.
CPC .......... *F16K 27/0209* (2013.01); *B60K 15/04* (2013.01); *F16K 15/148* (2013.01); *B60K 2015/03282* (2013.01); *B65D 77/225* (2013.01)

(58) Field of Classification Search
CPC ......... Y10T 137/7862; Y10T 137/7861; F16K 15/148; B60K 2015/03282; B65D 77/225
See application file for complete search history.

(56) References Cited

U.S. PATENT DOCUMENTS

| 3,949,780 A | * | 4/1976 | Buckman | ............... | F16K 15/148 |
| | | | | | 137/854 |
| 4,499,916 A | * | 2/1985 | Hanson | ................. | F16K 15/148 |
| | | | | | 137/907 |
| 7,628,143 B2 | * | 12/2009 | Yamada | ................. | F02M 37/44 |
| | | | | | 123/509 |
| 7,832,064 B2 | | 11/2010 | Nessel et al. | | |
| 8,936,008 B2 | | 1/2015 | Powell et al. | | |
| 9,793,642 B2 | | 10/2017 | Natter et al. | | |
| 10,185,374 B2 | | 1/2019 | Yang et al. | | |
| 10,711,830 B2 | | 7/2020 | Englebright et al. | | |
| 11,345,248 B1 | * | 5/2022 | Hitchcock | ............. | F16K 15/148 |
| 2003/0029885 A1 | * | 2/2003 | Kawolics | ............... | F16K 15/148 |
| | | | | | 222/105 |

(Continued)

FOREIGN PATENT DOCUMENTS

| AU | 634455 B2 | 2/1993 |
| CA | 2169032 C | 12/2006 |

*Primary Examiner* — Robert K Arundale
(74) *Attorney, Agent, or Firm* — Warner Norcross + Judd LLP

(57) ABSTRACT

A valve assembly is provided. The valve assembly includes a body having an annular valve seat. A central ring is concentric with the annular valve seat, and a plurality of vanes extend radially between the central ring and the annular valve seat. A receiver is defined by an axial through hole in the central ring and an annular outer lip adjacent the through hole. The outer lip includes a plurality of circumferentially spaced notches disposed in an inner perimeter of the lip. The assembly also includes an umbrella valve having a flexible, disk-shaped cap and an elongated stem extending axially from a center of the cap. The stem has an enlarged portion proximate a terminal end that is received through the outer lip and into the receiver to secure the umbrella valve in the central ring. A fuel reservoir and a method of making the valve assembly are also provided.

18 Claims, 8 Drawing Sheets

(56) References Cited

U.S. PATENT DOCUMENTS

| | | | |
|---|---|---|---|
| 2004/0182447 A1* | 9/2004 | Nicolino | F16K 15/148 |
| | | | 137/513.5 |
| 2015/0090357 A1* | 4/2015 | Yang | F16K 15/148 |
| | | | 137/843 |
| 2017/0009898 A1* | 1/2017 | Lee | B65D 77/00 |

* cited by examiner

VALVE ASSEMBLY INCLUDING LOW FORCE UMBRELLA VALVE INSERTION

FIELD OF THE INVENTION

The disclosure generally relates to insertion of an umbrella valve and, more specifically, to a valve assembly including an umbrella valve and a fuel reservoir including the same.

BACKGROUND OF THE INVENTION

Fuel reservoirs for use in fuel delivery systems of motor vehicles typically may include an umbrella valve at an opening in the bottom of the reservoir. Umbrella valves function as one-way flow check valves. In a fuel reservoir, the umbrella valve is a passive filling valve that allows fuel to enter into the reservoir when the fuel level in a fuel tank (within which the reservoir is located) is over the height of the reservoir opening, and when the fuel level goes below a certain level, the umbrella valve prevents flow out of the reservoir and helps to maintain the fuel covering as much of the area of the reservoir bottom as possible.

In conventional arrangements, the umbrella valve is inserted into the reservoir at the fuel opening by a pressing process, whereby a portion of the umbrella valve stem is deformed to allow it to pass through a hole in which it is inserted. Commonly, insertion of the umbrella valve is accomplished with a spring loaded device having a center pin that provides a certain amount of rigidity to the umbrella valve stem to reduce the valve deformation and to assure the insertion of the valve. However, conventional interfaces for insertion of the umbrella valve stem into the fuel reservoir allow for complete 360 degree contact of the valve stem with the fuel reservoir. These conventional interfaces have an inherent risk of the umbrella valve coming free from the reservoir hole due to incomplete insertion of the valve. Also, the softer the material of construction of the umbrella valve, the greater the amount of compression of the umbrella valve during insertion, which increases the risk that the valve will not be fully inserted and may separate from the fuel reservoir.

BRIEF SUMMARY

An improved valve assembly and a fuel reservoir including the valve assembly are provided. The valve assembly may provide for improved lead in and reduced insertion force upon introduction of an umbrella valve to the assembly, as well as greater assurance that the umbrella valve will remain inserted in the assembly. The valve assembly includes a body and an umbrella valve. The body includes an annular valve seat, a central ring disposed at a center of and concentric with the annular valve seat, and a plurality of vanes extending radially between the central ring and the annular valve seat. A plurality of fluid passages are defined by open space between the annular valve seat, the central ring, and the plurality of vanes. A receiver is defined by an axial through hole in the central ring and an annular outer lip adjacent the through hole. The outer lip includes a plurality of circumferentially spaced notches disposed in an inner perimeter of the outer lip. The umbrella valve has a flexible, disk-shaped cap and an elongated stem extending axially from a center of the cap. The stem has an enlarged portion proximate a terminal end. The enlarged portion is received through the outer lip and into the receiver to secure the umbrella valve in the central ring.

In specific embodiments, the outer lip includes three of the circumferentially spaced notches. In particular embodiments, the three circumferentially spaced notches are symmetrically and/or evenly disposed along the inner perimeter of the outer lip.

In specific embodiments, the circumferentially spaced notches have a curved shape.

In specific embodiments, the outer lip is raised above a surface of the central ring and projects outwardly from the surface of the central ring. The outer lip has a convexly shaped exterior surface. The outer lip extends into the through hole of the central ring. The inner perimeter of the outer lip is steeply sloped and extends into the through hole. In particular embodiments, the slope of the inner perimeter of the outer lip increases towards a terminal edge of the outer lip, and/or the inner perimeter of the outer lip extends within a cylindrical wall that defines the through hole.

In specific embodiments, the outer lip includes a shoulder adjacent a wall that defines the through hole. The shoulder retains the enlarged portion of the stem in the through hole.

In specific embodiments, the cap is moveable between a closed position where the cap completely overlays the plurality of fluid passages and is seated on the valve seat to an open position where the cap is lifted from the valve seat.

A fuel reservoir including the valve assembly is also provided. The fuel reservoir includes a body having an annular valve seat, a central ring disposed at a center of the body and concentric with the annular valve seat, and a plurality of vanes extending radially between the central ring and the annular valve seat. A plurality of fluid passages are defined by open space between the valve seat, the central ring, and the plurality of vanes. The fluid passages define an opening in a bottom surface of the fuel reservoir. A receiver for receiving an umbrella valve is defined by an axial through hole in the central ring and an annular outer lip adjacent the through hole. The outer lip includes a plurality of circumferentially spaced notches disposed in an inner perimeter of the outer lip.

In specific embodiments, the umbrella valve has a flexible, disk-shaped cap and an elongated stem extending axially from a center of the cap. The stem has an enlarged portion proximate a terminal end. The enlarged portion is received through the outer lip and into the receiver to secure the umbrella valve in the central ring.

A method of making the valve assembly is also provided. The method includes forming a body including an annular valve seat, a central ring disposed at a center of the body and concentric with the annular valve seat, and a plurality of vanes extending radially between the central ring and the annular valve seat. A plurality of fluid passages are defined by open space between the valve seat, the central ring, and the plurality of vanes. A receiver is defined by an axial through hole in the central ring and an annular outer lip adjacent the through hole. The outer lip includes a plurality of circumferentially spaced notches disposed in an inner perimeter of the outer lip. The method also includes providing an umbrella valve having a flexible, disk-shaped cap and an elongated stem extending axially from a center of the cap, the stem having an enlarged portion proximate a terminal end. The method also includes inserting the enlarged portion of the umbrella valve through the outer lip and into the receiver to secure the umbrella valve in the central ring.

In specific embodiments, the method further includes forming the body in a bottom surface of a fuel reservoir.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A valve assembly including an umbrella valve and a reservoir including the valve assembly are provided. Referring to FIGS. 1-7, wherein like numerals indicate corresponding parts throughout the several views, the reservoir is illustrated and generally designated as a fuel reservoir 10 for a vehicle fuel system that pumps liquid fuel, by way of non-limiting example only gasoline or diesel fuel, from a fuel tank (not shown) in which the reservoir is located to an internal combustion engine (not shown). The fuel reservoir 10 includes a valve assembly 12. Certain features of the valve assembly 12 are functional, but can be implemented in different aesthetic configurations. While the reservoir is illustrated as fuel reservoir 10, it should be understood that the invention is not to be limited to a fuel reservoir, and the valve assembly 12 could also be applied to other applications.

Figure 1:
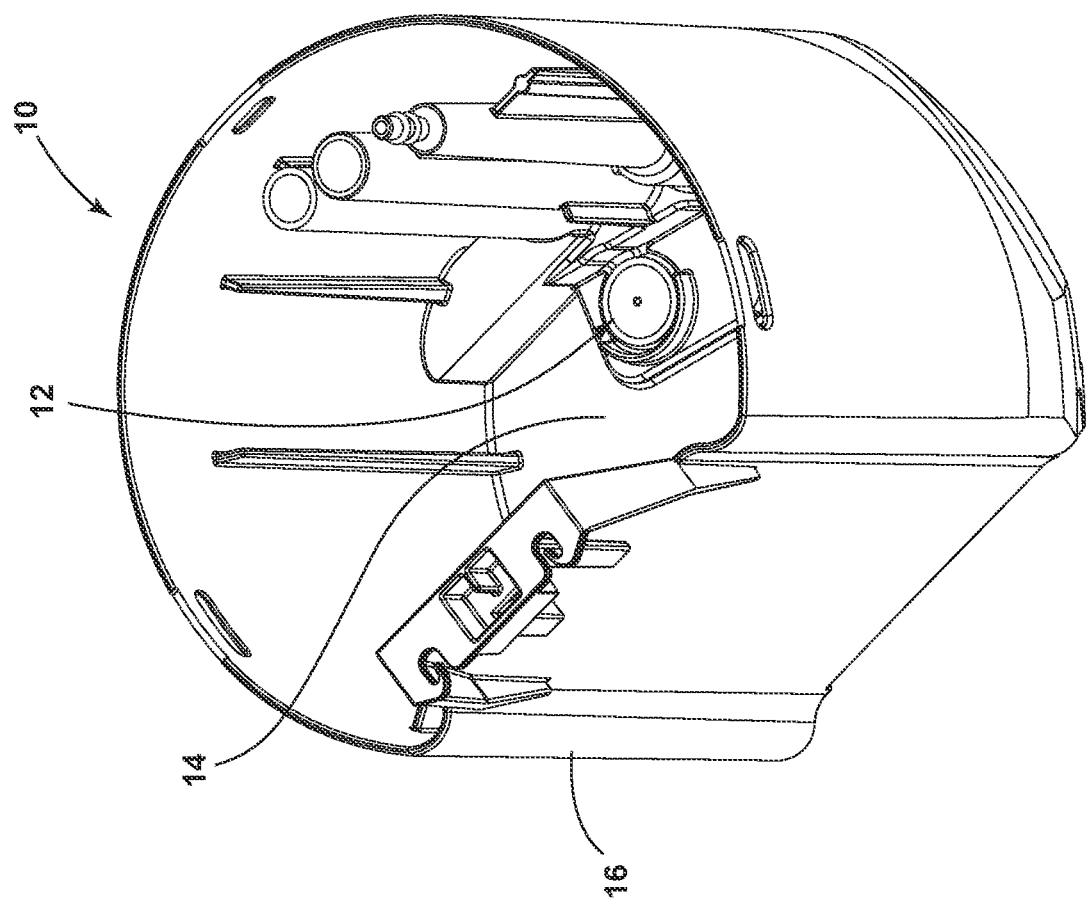
FIG. 1 is a perspective view of a fuel reservoir of a vehicle fuel system including a valve assembly in accordance with some embodiments of the disclosure.
Figure 2:
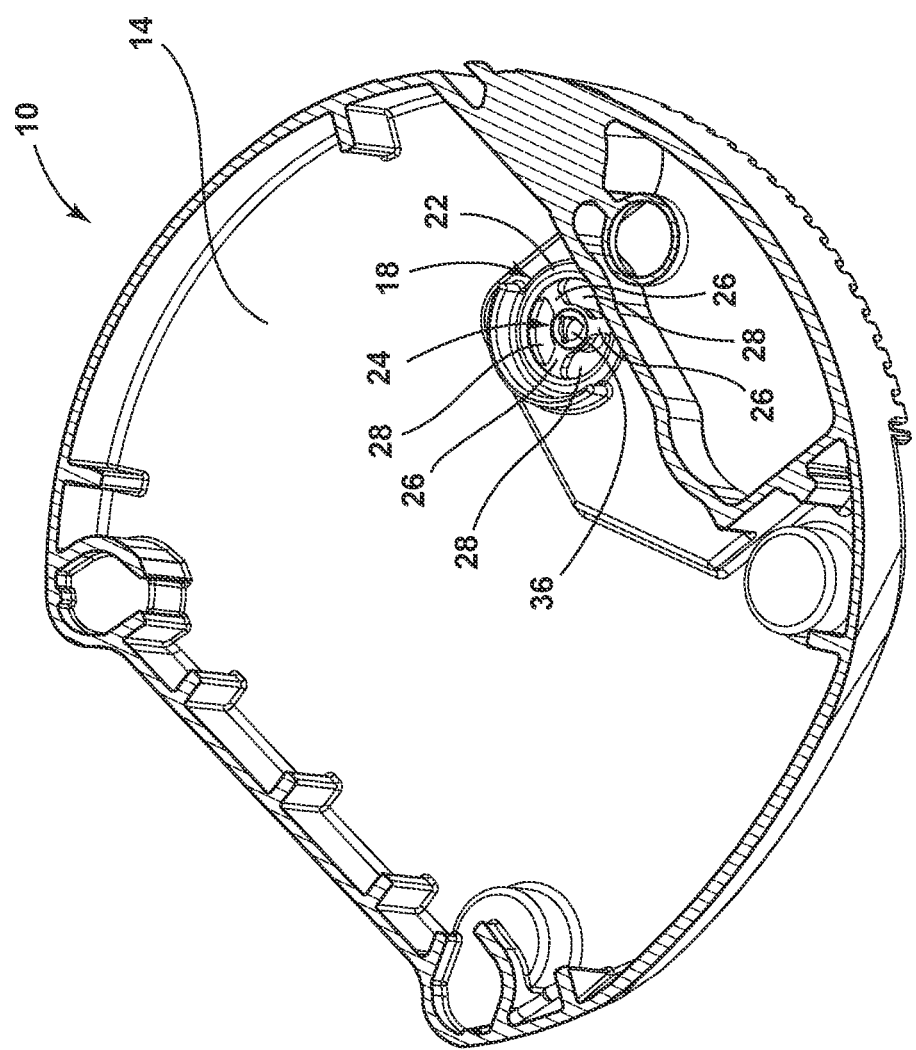
FIG. 2 is a perspective view of a bottom of the fuel reservoir of FIG. 1.
Figure 3:
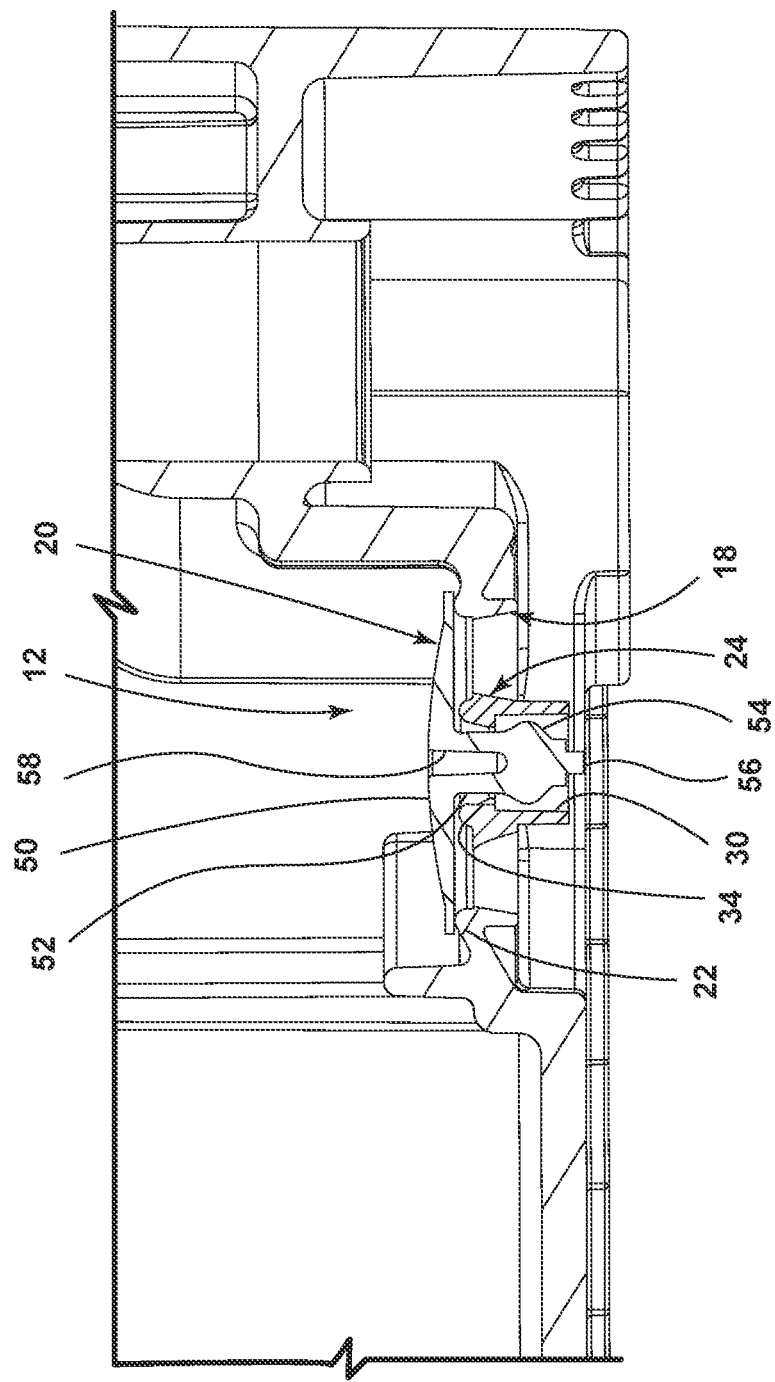
FIG. 3 is a cross-sectional view of a portion of the fuel reservoir of FIG. 1 including the valve assembly.
Figure 4:
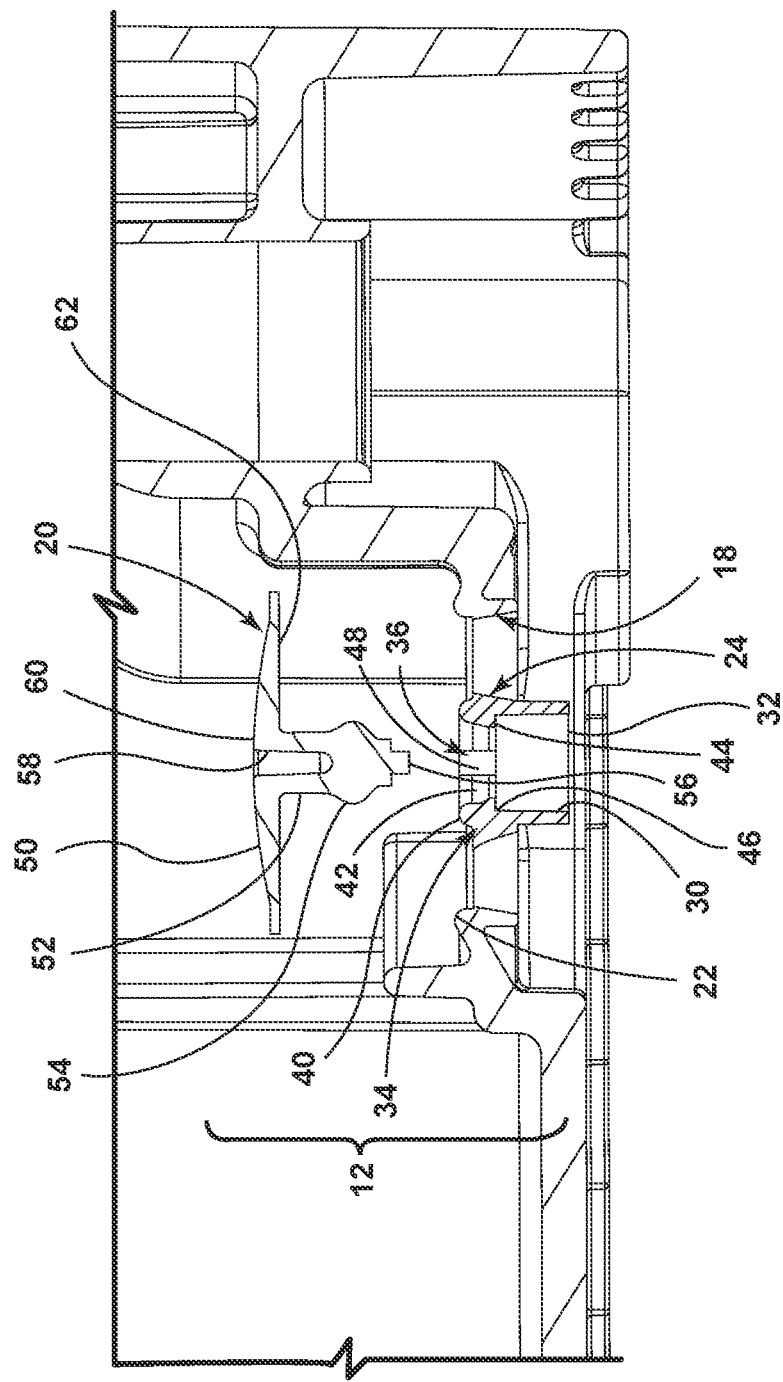
FIG. 4 is an exploded view of the cross-section of the fuel reservoir shown in FIG. 3.

FIG. 1 depicts a generally vertical fuel reservoir 10 of a fuel pump module used in a vehicle fuel system. In use, the reservoir 10 is installed in a fuel tank with a bottom 14 of the reservoir 10 facing a bottom of the fuel tank. The reservoir 10 includes a sidewall 16 that together with the bottom 14 and a cover (not shown) define an internal volume of the reservoir 10. Fuel enters the reservoir 10 through the valve assembly 12 which is located in the bottom 14 of the reservoir 10.

As shown in greater detail in FIGS. 2-7, the valve assembly 12 includes a body 18 and an umbrella valve 20. The body 18 includes an annular valve seat 22 around the periphery of the body 18 that surrounds an opening formed within the body 18 and in the bottom 14 of the reservoir 10. A central ring 24 is disposed at a center of the annular valve seat 22 and is concentric with the valve seat 22. A plurality of vanes 26 extend radially between the central ring 24 and the valve seat 22. A plurality of fluid passages 28 are disposed within the body 18 for communication of fluid such as fuel. The fluid passages 28 are defined by the open spaces between the valve seat 22, the central ring 24, and the plurality of vanes 26. The fluid passages 28 of the body 18 of the valve assembly 12 define the opening in the bottom 14 of the fuel reservoir 10. The central ring 24 has a cylindrical wall 30 that defines an axial through hole 32, and an annular outer lip 34 that is adjacent the through hole 32. The through hole 32 and annular outer lip 34 together define a receiver 36 for the umbrella valve 20. The lip 34 is raised above a face surface 38 of the central ring 24 and projects outwardly from the face surface 38 of the central ring 24. The lip 34 has a curved, convexly shaped exterior surface 40 and an endless, circumferentially extending inner perimeter 42. The exterior surface 40 of the lip 34 forms a ridge on top of the face surface 38 of the central ring 24. The inner perimeter 42 of the lip 34 extends within the cylindrical wall 30 that defines the through hole 32. The inner perimeter 42 is steeply sloped (nearly vertical, i.e. nearly parallel with the axial direction of the through hole 32) and extends into the through hole 32. The slope of the inner perimeter 42 of the lip 34 also may increase from the transition between the exterior surface 40 and the inner perimeter 42 and/or towards a terminal edge 44 of the lip 34. The lip 34 includes a shoulder 46 adjacent the cylindrical wall 30 and extending between the cylindrical wall 30 and the terminal edge 44 of the lip 34.

Figure 5:
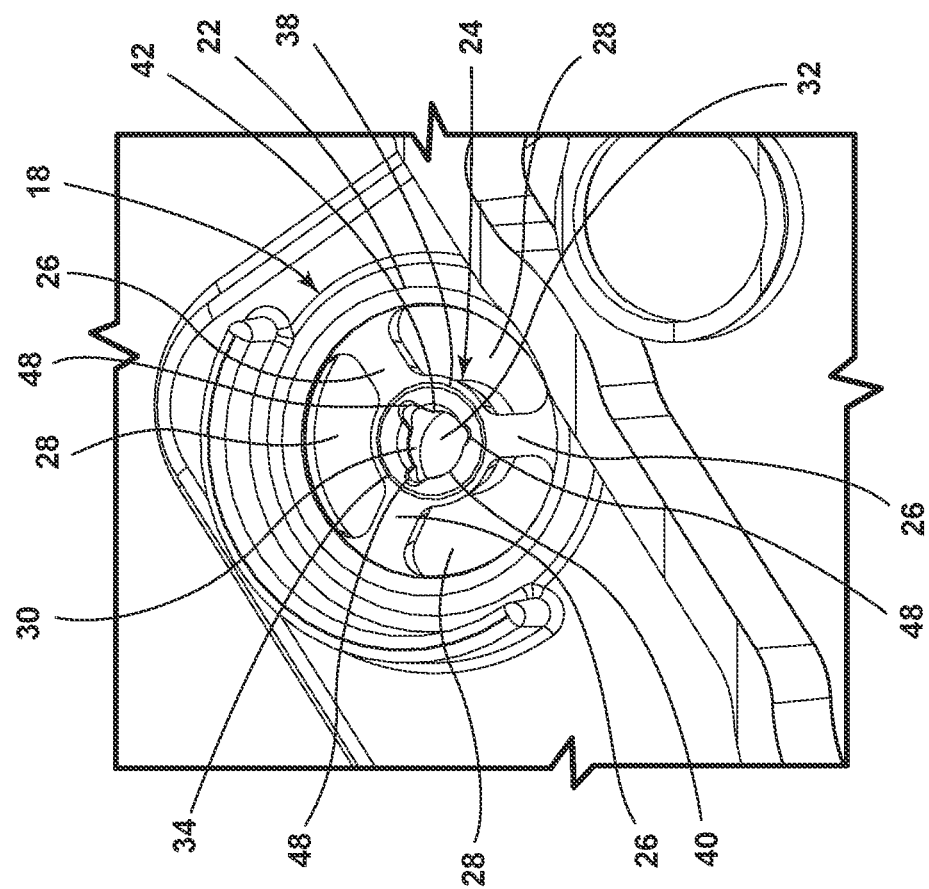
FIG. 5 is an enlarged view of a body of the valve assembly of FIG. 1.
Figure 6B:
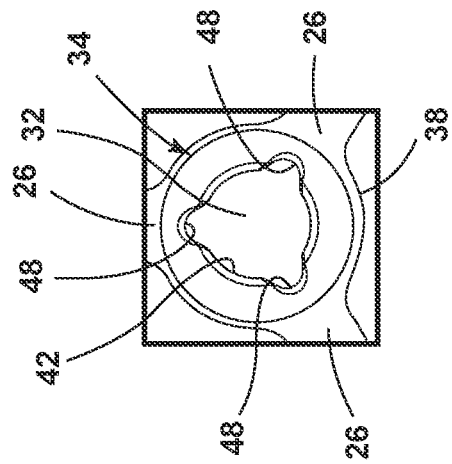
FIG. 6B is a plan view of a portion of the body of the valve assembly.
Figure 6A:
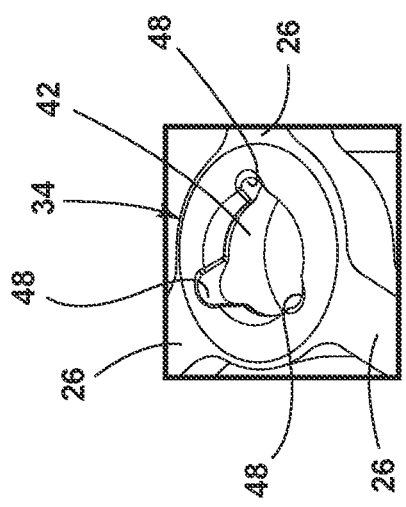
FIG. 6A is a perspective view of a portion of the body of the valve assembly.
Figure 7:
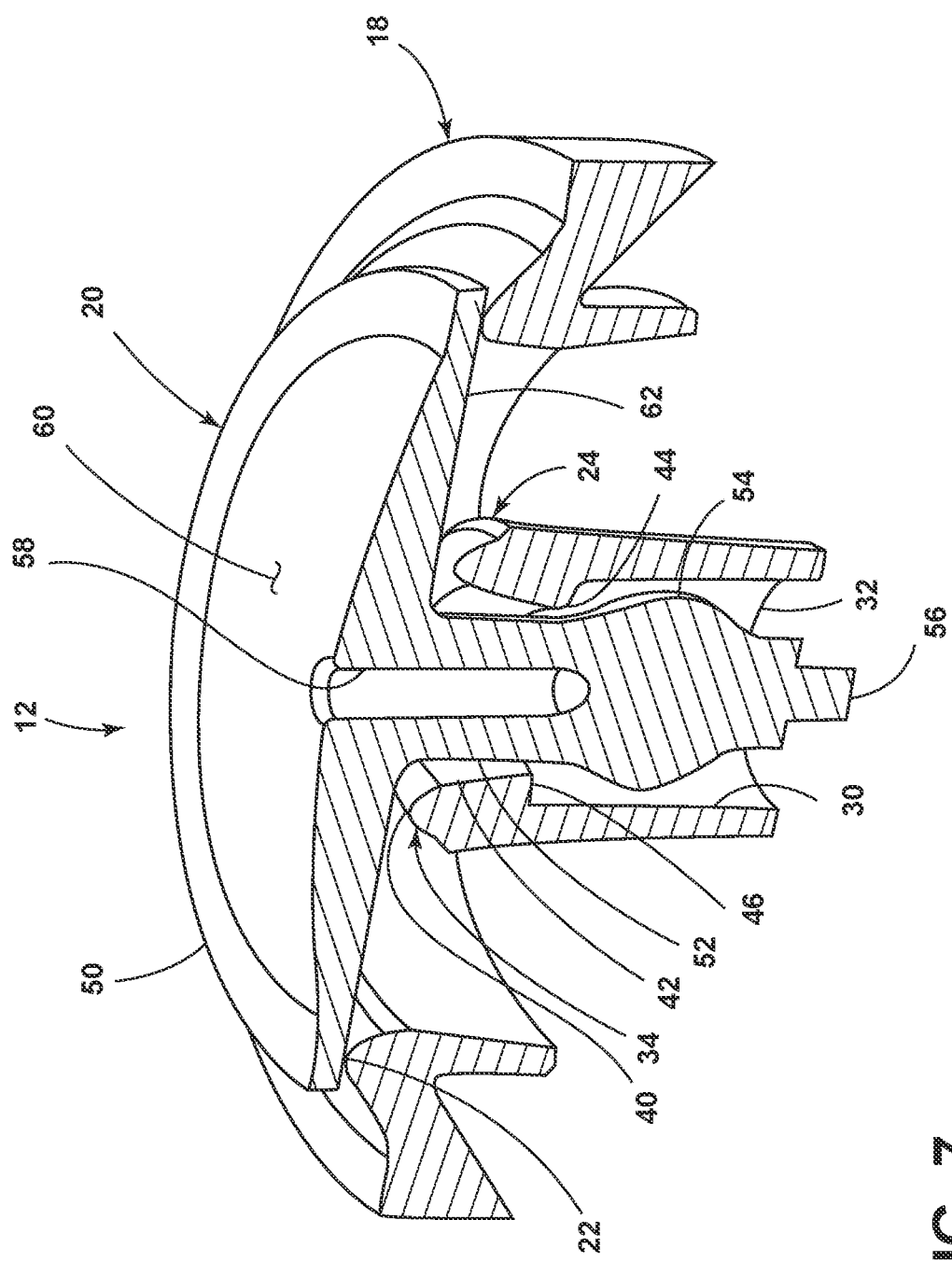
FIG. 7 is a sectional view of the valve assembly.

With particular reference to FIGS. 5-6B, the lip 34 further includes a plurality of circumferentially spaced notches 48 formed along the inner perimeter 42 of the lip 34. The notches 48 provide low-force insertion points for the umbrella valve 20 as described in more detail below. In the embodiment shown in the drawings, the outer lip 34 includes three of these circumferentially spaced notches 48, but the valve assembly 12 is not limited to three notches 48. The three circumferentially spaced notches 48 are evenly spaced and symmetrically disposed along the inner perimeter 42 of the lip 34, i.e. each notch 48 is 120 degrees apart from the neighboring notches 48 along the 360 degrees of the inner perimeter 42. Each notch 48 has a curved, concave surface that is an indentation that extends into the inner perimeter 42 of the lip 34.

Figure 8:
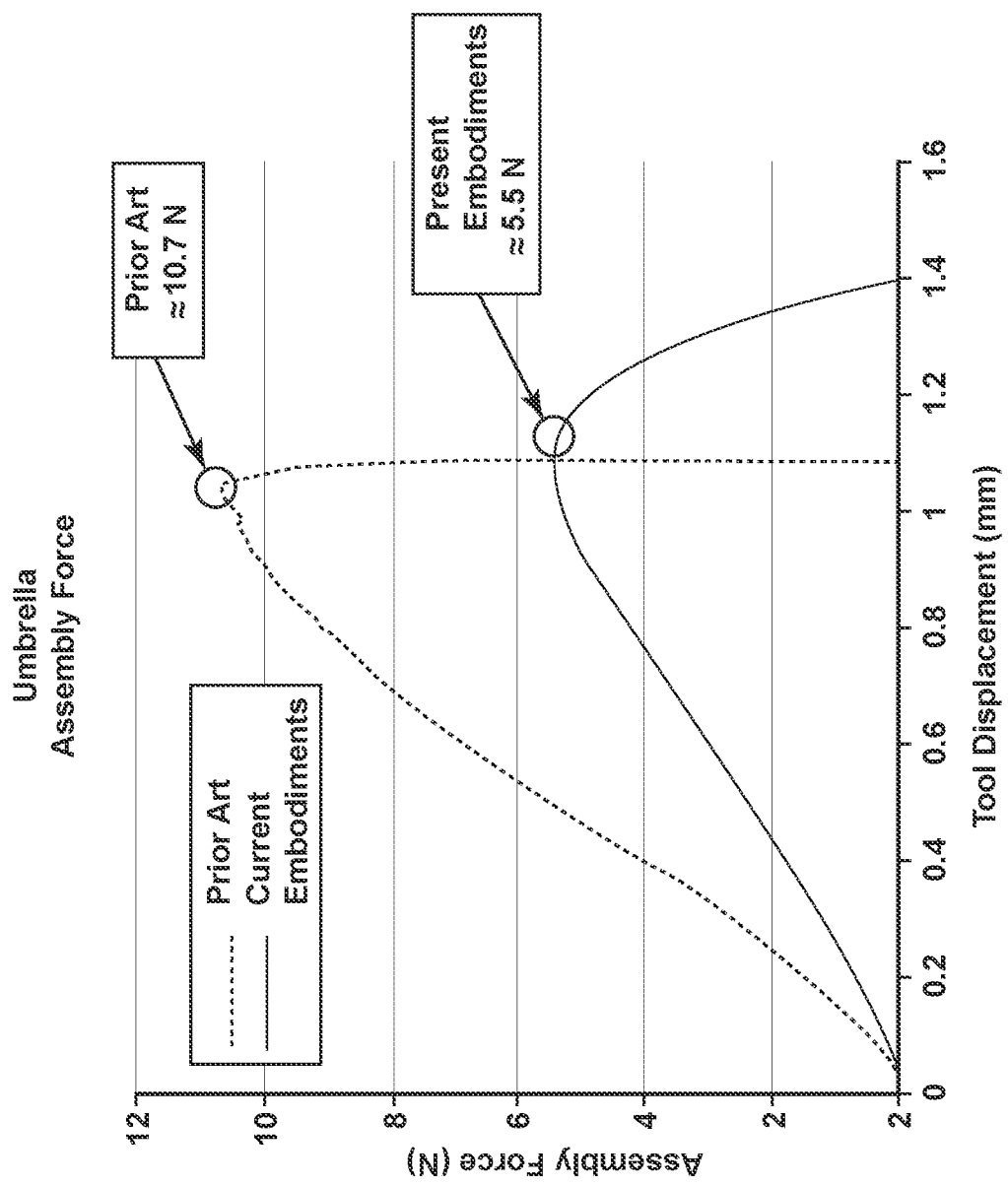
FIG. 8 is a graphical representation of assembly force required for assembling the valve assembly of FIG. 1 in comparison to the prior art.

The umbrella valve 20 has a flexible, disk-shaped cap 50 and an elongated stem 52 extending axially from a center of the underside of the cap 50. The stem 52 has an enlarged, bulbous portion 54 proximate a terminal end 56 of the stem 52. The enlarged portion 54 is received within the outer lip 34 and into the receiver 36 to secure the umbrella valve 20 in the central ring 24, such that a longitudinal axis of the umbrella valve 20/stem 52 is coaxially aligned with a longitudinal axis of the body 18/central ring 24. As can be best seen in the exploded view of FIG. 4, to mount the umbrella valve 20 in the receiver 36 of the body 18, a spring loaded tool (not shown) may be used. The spring loaded tool includes a center pin that can be inserted into an axial recess 58 in a top surface 60 of the cap 50 of the umbrella valve 20. The pin of the tool provides some rigidity to the stem 52 of the umbrella valve 20 and is used to push the enlarged portion 54 through the opening surrounded by the outer lip 34 and ultimately past the shoulder 46 of the lip 34. As the enlarged portion 54 is pushed through the lip 34, the three notches 48 along the inner perimeter 42 of the lip 34 accommodate the compression of the enlarged portion 54 and reduce the force required to push the enlarged section through and past the lip 34. Further, the curved, smooth shape of the exterior surface 40 of the lip 34 and the steep sloped surface of the inner perimeter 42 of the lip 34 provide for a smooth rather than abrupt entry of the enlarged portion 54 into the receiver 36. Thus, the notches 48 in the lip 34 and shape of the lip 34 assure that the umbrella valve 20 is completely inserted into and fully retained in the receiver 36. Additionally, the shoulder 46 of the lip 34 retains the enlarged portion 54 of the stem 52 in the through hole 32. As shown graphically in FIG. 8, the force required to insert an umbrella valve into a conventional receiver is about 10.7 N, whereas the force required for the subject assembly is only about 5.5 N. However, the subject assembly requires a slightly longer tool displacement distance to fully insert the umbrella valve 20 in comparison to conventional assemblies.

The stem 52 of the umbrella valve 20 may have a length/height that is slightly longer than the length/height of the through hole 32 in the central ring 24. These relative lengths/heights allows the stem 52 including the enlarged portion 54 to move within the through hole 32 such that the cap 50 may be raised and lowered relative to the valve seat 22. Particularly, the cap 50 is moveable between a closed position where the cap 50 completely overlays the plurality of fluid passages 28 and is seated on the valve seat 22 to an open position where the cap 50 is lifted from the valve seat 22. In the closed position, the cap 50 prevents flow of fluid through the valve assembly 12 to act as a check valve that prevents the liquid such as fuel from leaving the internal volume of the reservoir 10. When fluid pressure builds against the underside (bottom surface 62) of the cap 50 of the umbrella valve 20, the cap 50 is lifted from the valve seat 22 and moved to an open position in which fluid can flow through the fluid passages 28 in the body 18 and into the reservoir 10.

While the invention has been described in relation to an umbrella valve having a stem that is inserted into a receiver of a valve body, it should be understood that the invention may be applied to other applications in which a stud pin or other elongated member is inserted into an aperture or socket having the same configuration as the disclosed receiver 36. One such arrangement is a connector pin that is inserted into a socket to connect two members together, such as a panel to a frame.

The various elements of the components of the valve assembly 12 described above, e.g. the body 18 and the umbrella valve 20, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components of the valve assembly 12 (e.g. the body 18, the umbrella valve 20, etc.) is monolithic in construction.

In general, materials suitable for use in or the body 18 and the umbrella valve 20 include metals (e.g. steels, aluminums, alloys, etc.), resins (e.g. thermoset and/or thermoplastic resins), rubbers/elastomers, and combinations thereof. However, myriad materials may be used to manufacture the elements of the valve assembly 12, each typically selected as a function of availability, cost, performance/end use applications, etc. Moreover, metals, metal alloys, rubbers/elastomers, and resins are not exhaustive of suitable materials that may be used. In general, the umbrella valve 20 comprises a flexible polymeric material such as a rubber/elastomer. However, the umbrella valve 20 may comprise any number of materials suitable for providing the umbrella valve 20 with deformable resiliency.

In certain embodiments, the valve assembly 12 comprises a resin, such as a thermoplastic and/or thermoset resin. In such embodiments, the body 18 and/or the umbrella valve 20 may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the valve assembly 12 comprise material suitable for use under continuous exposure to temperatures of from −40° C. to 120° C., or from −40° C. to 135° C. and/or pressures of from 0.5 to 2 bar. In certain embodiments, one or more, alternatively all, of the various components of the valve assembly 12 comprises materials that can withstand up to 30 minutes, alternatively more than 30 minutes, of exposure to temperatures of up to 150° C. without irreversible harmful effects (e.g. melting, etc.). In some embodiments, the umbrella valve 20 comprises a synthetic or natural rubber or polyamide or an ethylene-propylene rubber. In some embodiments, the umbrella valve 20 has a lower durometer than the body 18.

With regard to composition of the particular components of the valve assembly 12 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With regard to composition of the particular components of the valve assembly 12 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the valve assembly 12 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A valve assembly comprising: a body including an annular valve seat, a central ring disposed at a center of and concentric with the annular valve seat, and a plurality of vanes extending radially between the central ring and the annular valve seat; a plurality of fluid passages defined by open space between the annular valve seat, the central ring, and the plurality of vanes; a receiver defined by an axial through hole in the central ring and an annular outer lip adjacent the through hole, the outer lip including a plurality of circumferentially spaced notches disposed in an inner perimeter of the outer lip, wherein each of the plurality of notches is an indentation extending into the inner perimeter of the outer lip and not extending through the central ring; and an umbrella valve having a flexible, disk-shaped cap and an elongated stem extending axially from a center of the cap, the stem having an enlarged portion proximate a terminal end; the enlarged portion being received through the outer lip and into the receiver to secure the umbrella valve in the central ring.

2. The valve assembly of claim 1, wherein the outer lip includes three of the circumferentially spaced notches.

3. The valve assembly of claim 2, wherein the three circumferentially spaced notches are symmetrically disposed along the inner perimeter of the outer lip.

4. The valve assembly of claim 1, wherein the circumferentially spaced notches are evenly disposed along the inner perimeter of the outer lip.

5. The valve assembly of claim 1, wherein the circumferentially spaced notches have a curved shape.

6. The valve assembly of claim 1, wherein the outer lip is raised above a surface of the central ring and projects outwardly from the surface of the central ring.

7. The valve assembly of claim 1, wherein the outer lip extends into the through hole of the central ring.

8. The valve assembly of claim 1, wherein the outer lip has a convexly shaped exterior surface.

9. The valve assembly of claim 1, wherein the inner perimeter of the outer lip is sloped and extends into the through hole.

10. The valve assembly of claim 9, wherein the slope of the inner perimeter of the outer lip increases towards a terminal edge of the outer lip.

11. The valve assembly of claim 9, wherein the inner perimeter of the outer lip extends within a cylindrical wall that defines the through hole.

12. The valve assembly of claim 1, wherein the outer lip includes a shoulder adjacent a wall that defines the through hole, the shoulder retaining the enlarged portion of the stem in the through hole.

13. The valve assembly of claim 1, wherein the cap is moveable between a closed position where the cap completely overlays the plurality of fluid passages and is seated on the valve seat to an open position where the cap is lifted from the valve seat.

14. A fuel reservoir for a motor vehicle fuel system, the fuel reservoir comprising:

the valve assembly of claim 1; wherein the body defines an opening in a bottom surface of the fuel reservoir.

15. A fuel reservoir comprising: a body including an annular valve seat, a central ring disposed at a center of the body and concentric with the annular valve seat, and a plurality of vanes extending radially between the central ring and the annular valve seat; a plurality of fluid passages defined by open space between the valve seat, the central ring, and the plurality of vanes, the fluid passages defining an opening in a bottom surface of the fuel reservoir; and a receiver for receiving an umbrella valve, the receiver being defined by an axial through hole in the central ring and an annular outer lip adjacent the through hole, the outer lip including a plurality of circumferentially spaced notches disposed in an inner perimeter of the outer lip, wherein each of the plurality of notches is an indentation extending into the inner perimeter of the outer lip and not extending through the central ring.

16. The fuel reservoir of claim 15, wherein the umbrella valve has a flexible, disk-shaped cap and an elongated stem extending axially from a center of the cap, the stem having an enlarged portion proximate a terminal end, and the enlarged portion is received through the outer lip and into the receiver to secure the umbrella valve in the central ring.

17. A method of making a valve assembly, the method comprising: forming a body including an annular valve seat, a central ring disposed at a center of the body and concentric with the annular valve seat, and a plurality of vanes extending radially between the central ring and the annular valve seat, wherein a plurality of fluid passages are defined by open space between the valve seat, the central ring, and the plurality of vanes, and wherein a receiver is defined by an axial through hole in the central ring and an annular outer lip adjacent the through hole, the outer lip including a plurality of circumferentially spaced notches disposed in an inner perimeter of the outer lip, wherein each of the plurality of notches is an indentation extending into the inner perimeter of the outer lip and not extending through the central ring; providing an umbrella valve having a flexible, disk-shaped cap and an elongated stem extending axially from a center of the cap, the stem having an enlarged portion proximate a terminal end; and inserting the enlarged portion of the umbrella valve through the outer lip and into the receiver to secure the umbrella valve in the central ring.

18. The method of claim 17, wherein the step of forming the body includes forming the body in a bottom surface of a fuel reservoir.

\* \* \* \* \*